United States Patent [19]

Moulliet

[11] Patent Number: 5,389,821
[45] Date of Patent: Feb. 14, 1995

[54] DRAINWATER/SEWAGE TREATMENT INSTALLATION FOR PRODUCING ELECTRICAL POWER AND FOR REGULATING A HYDRAULIC FLOW

[75] Inventor: Claude Moulliet, Nanterre, France

[73] Assignee: GTM Batiment et Travaux Publics, Societe Anonyme, Nanterre, France

[21] Appl. No.: 153,572

[22] Filed: Nov. 17, 1993

[30] Foreign Application Priority Data

Nov. 20, 1992 [FR] France .................. 92 13948

[51] Int. Cl.⁶ .............. F03B 13/06; E03B 1/00; E02B 9/06; E02D 29/10
[52] U.S. Cl. ...................... 290/1 R; 290/43; 290/52; 290/54
[58] Field of Search ............ 290/4 R, 4 D, 43, 54, 290/1 R, 52

[56] References Cited

U.S. PATENT DOCUMENTS

| | | | |
|---|---|---|---|
| 1,921,905 | 8/1933 | Blom | 290/4 D |
| 3,939,356 | 2/1976 | Loane | 290/54 |
| 4,182,128 | 1/1980 | Gardner | 60/652 |
| 4,282,444 | 8/1981 | Ramer | 290/52 |
| 4,310,769 | 1/1982 | Mazzone et al. | 290/54 |
| 4,443,707 | 4/1984 | Scieri et al. | 290/54 |

FOREIGN PATENT DOCUMENTS 525293 9/1921 France .
8304425 12/1983 WIPO .

OTHER PUBLICATIONS

COMPENDEX, A.N. 89(1):3167, "Tunnel and reservoir plan solution to Chicago's ...", W. A. Bergman et al., 1988.
CEDB, A.N. 9004782, "Rochester stops the delage", J. Holzbach et al., Civil Engineering–ASCE (Dec. 1990) vol. 60, No. 12, pp. 42–44.
COMPENDEX, A.N. 81(10):6704, "Fundamentals of the use of rock tunnels ...", P. Stahre, 1981.
DOE/TIC/EG.82/124 "Energy Storage in Hard Rock".
FLUIDEX, A.N. 46034, "Pumped storage hydro and sewage plants may go underground", ENR, vol. 194, No. 21, May 22, 1975, p. 12.

Primary Examiner—A. D. Pellinen
Assistant Examiner—Robert Lloyd Hoover
Attorney, Agent, or Firm—Gottlieb, Rackman & Reisman

[57] ABSTRACT

A drainwater/sewage treatment installation for producing electrical power and for regulating waterflow in a drainage network is provided. The installation comprises at least a first reservoir, at least a second reservoir below the first reservoir and conduits connecting the reservoirs. The invention combines a drainage network having a pumped energy storage hydroelectric station and at least a two reservoir system wherein the second reservoir is connected to the drainage network in order to be able to serve as a temporary storage facility for the purpose of spreading out peaks in the flow rate of rain water in the drainage network.

14 Claims, 7 Drawing Sheets

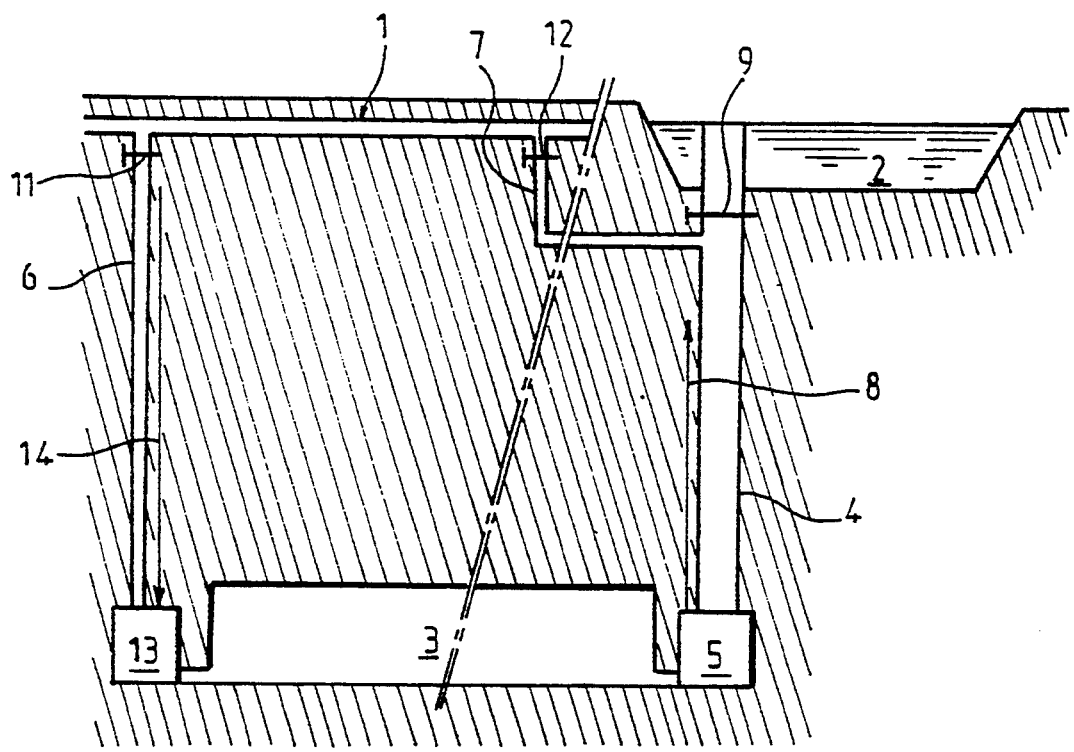
FIG_1
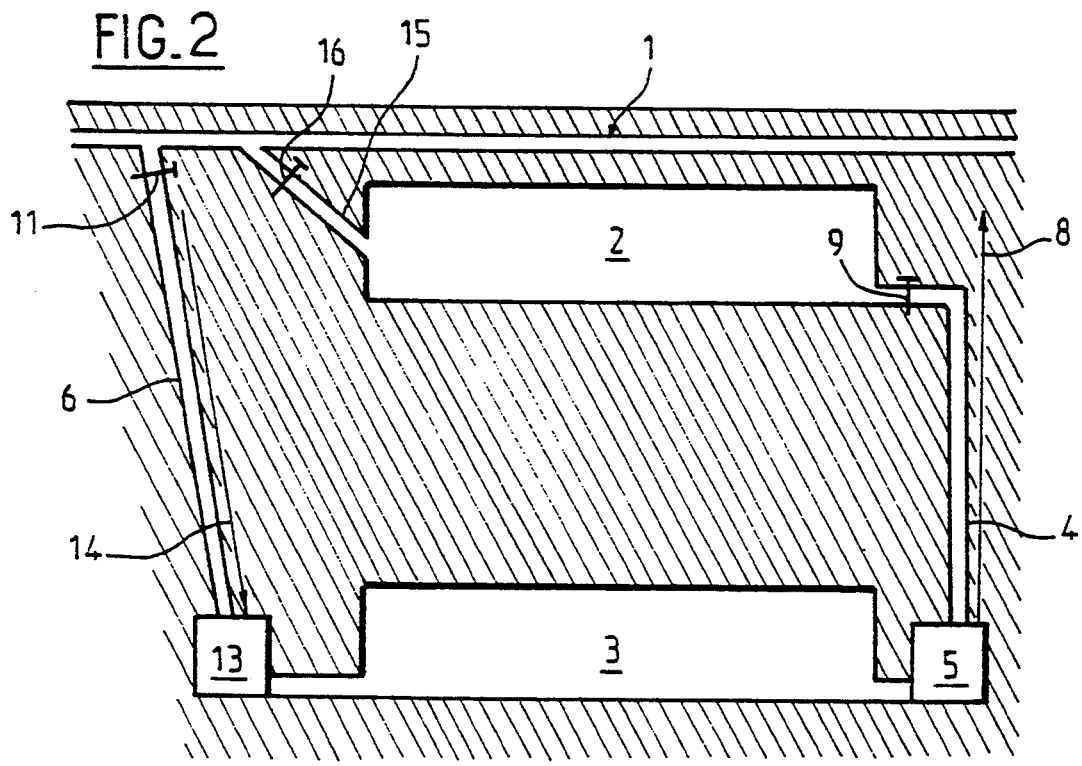
FIG_2

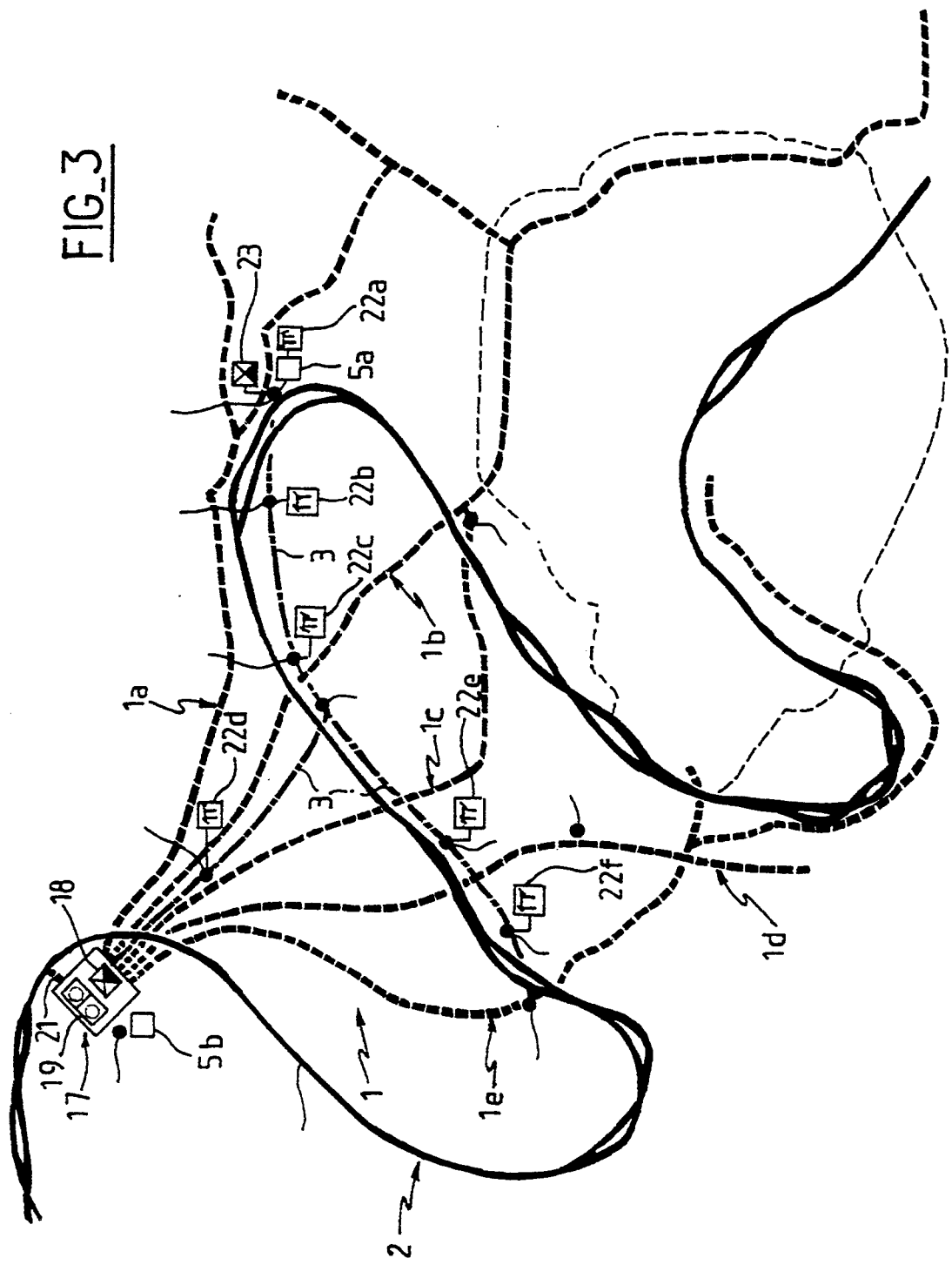

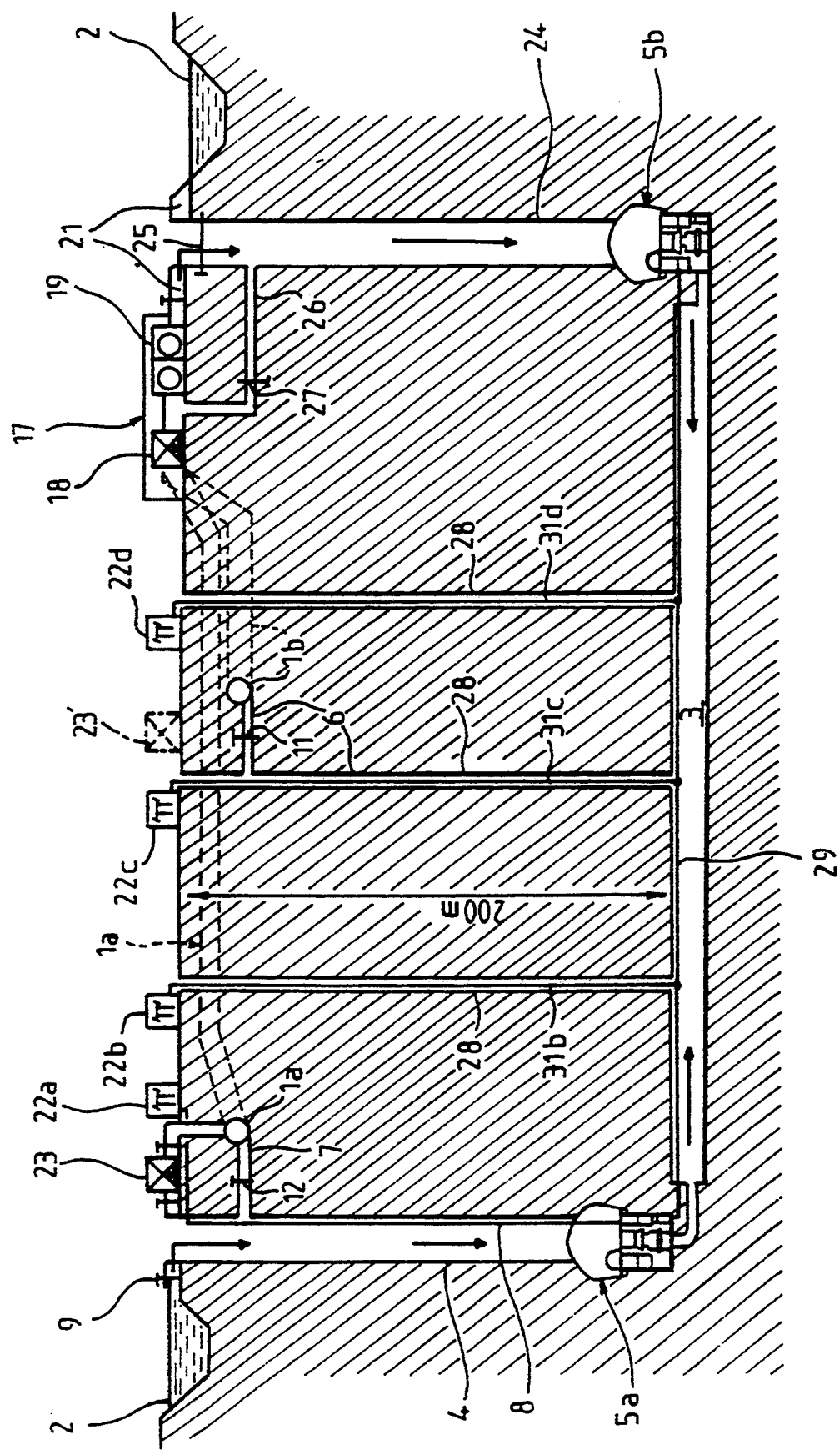
FIG_4a

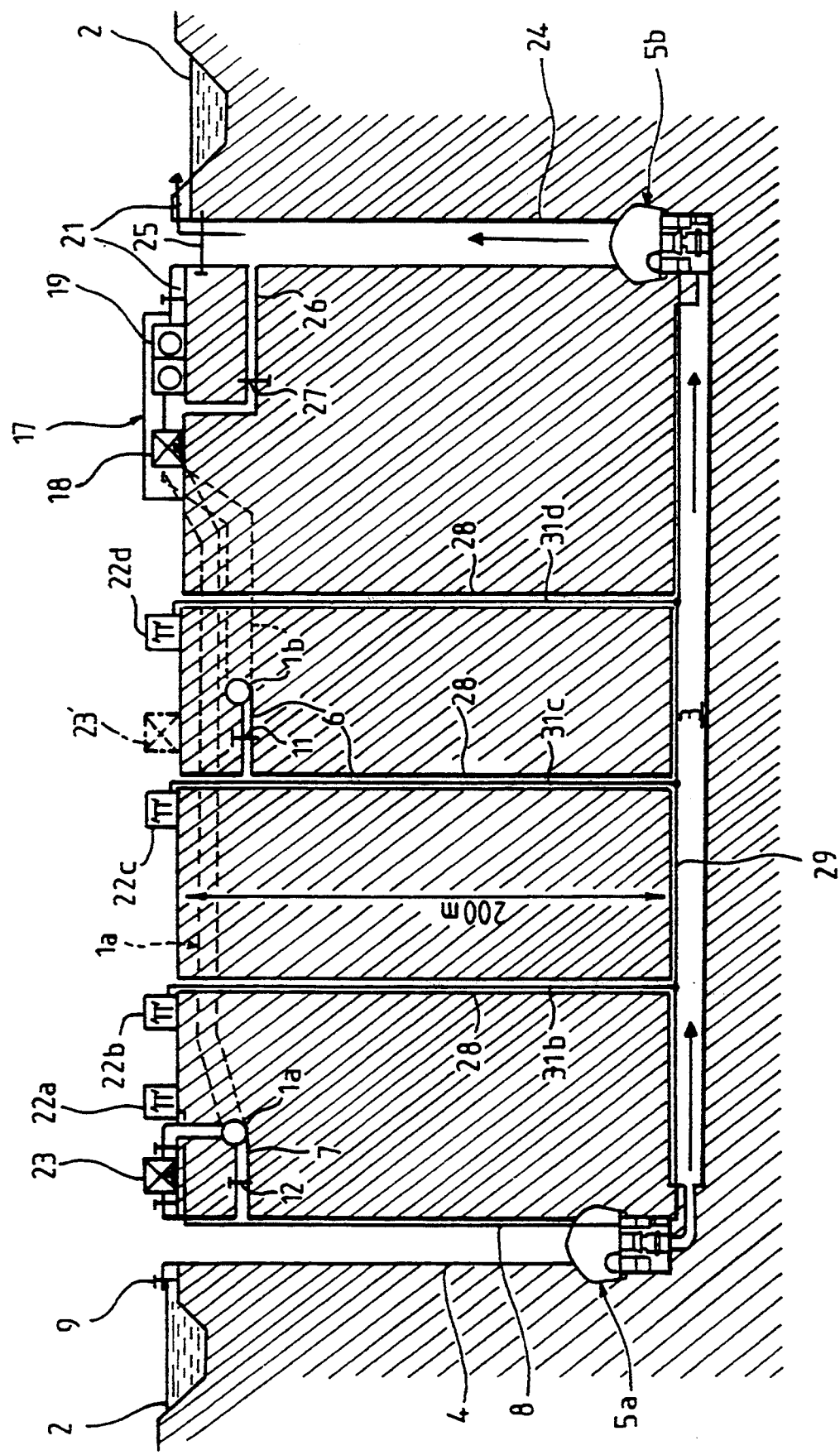
FIG_4b

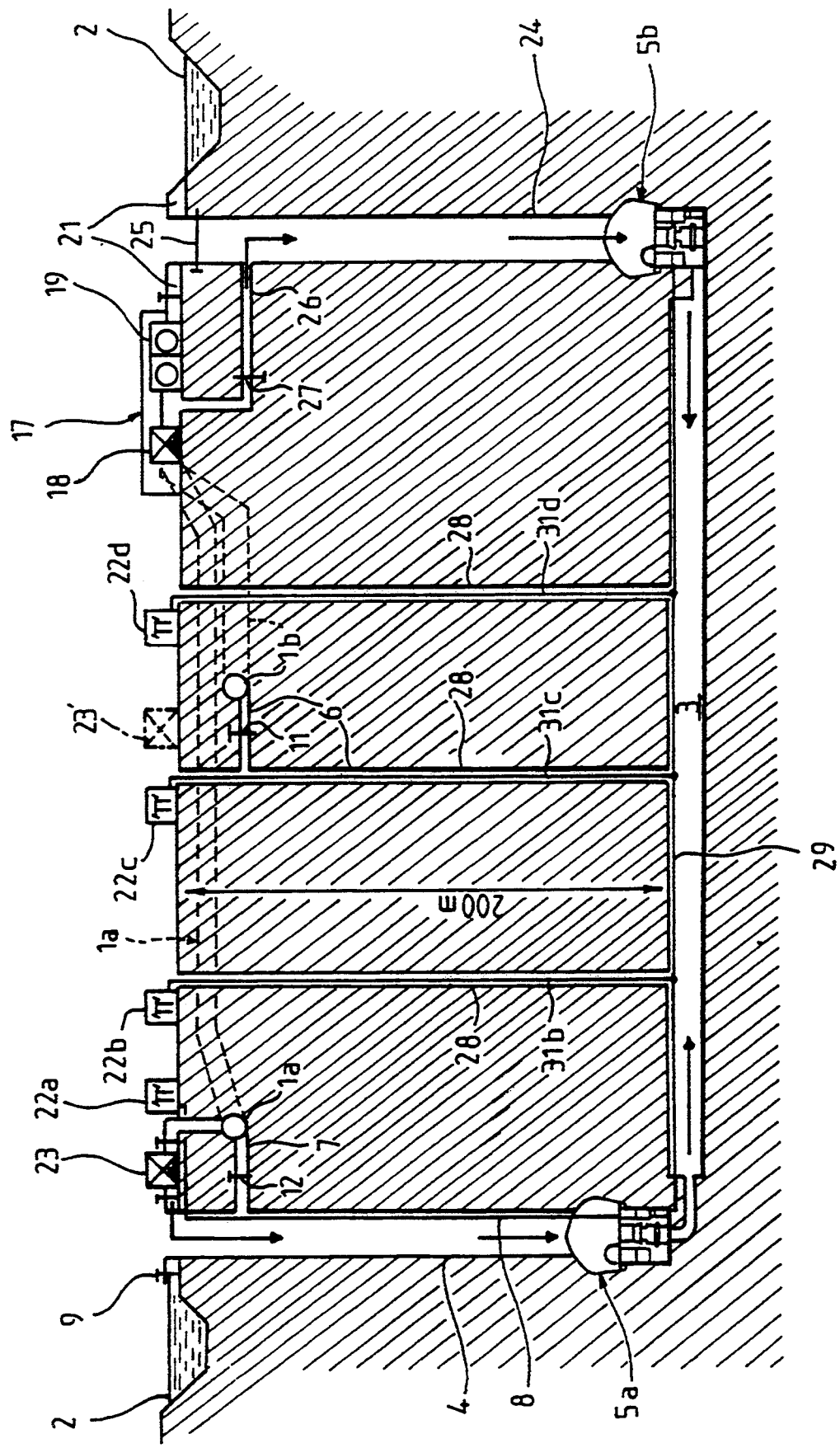
FIG_4c

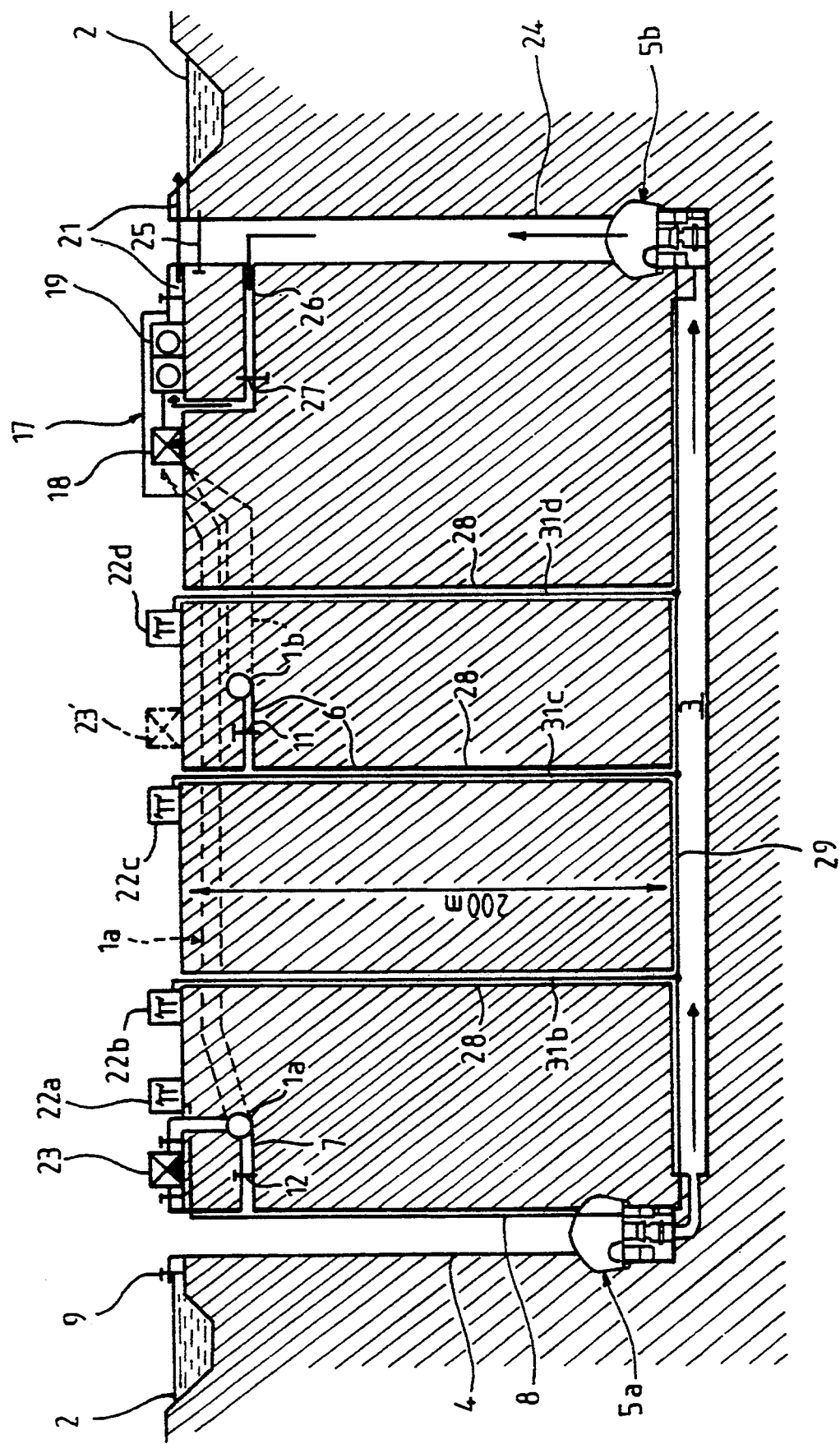
FIG_4d

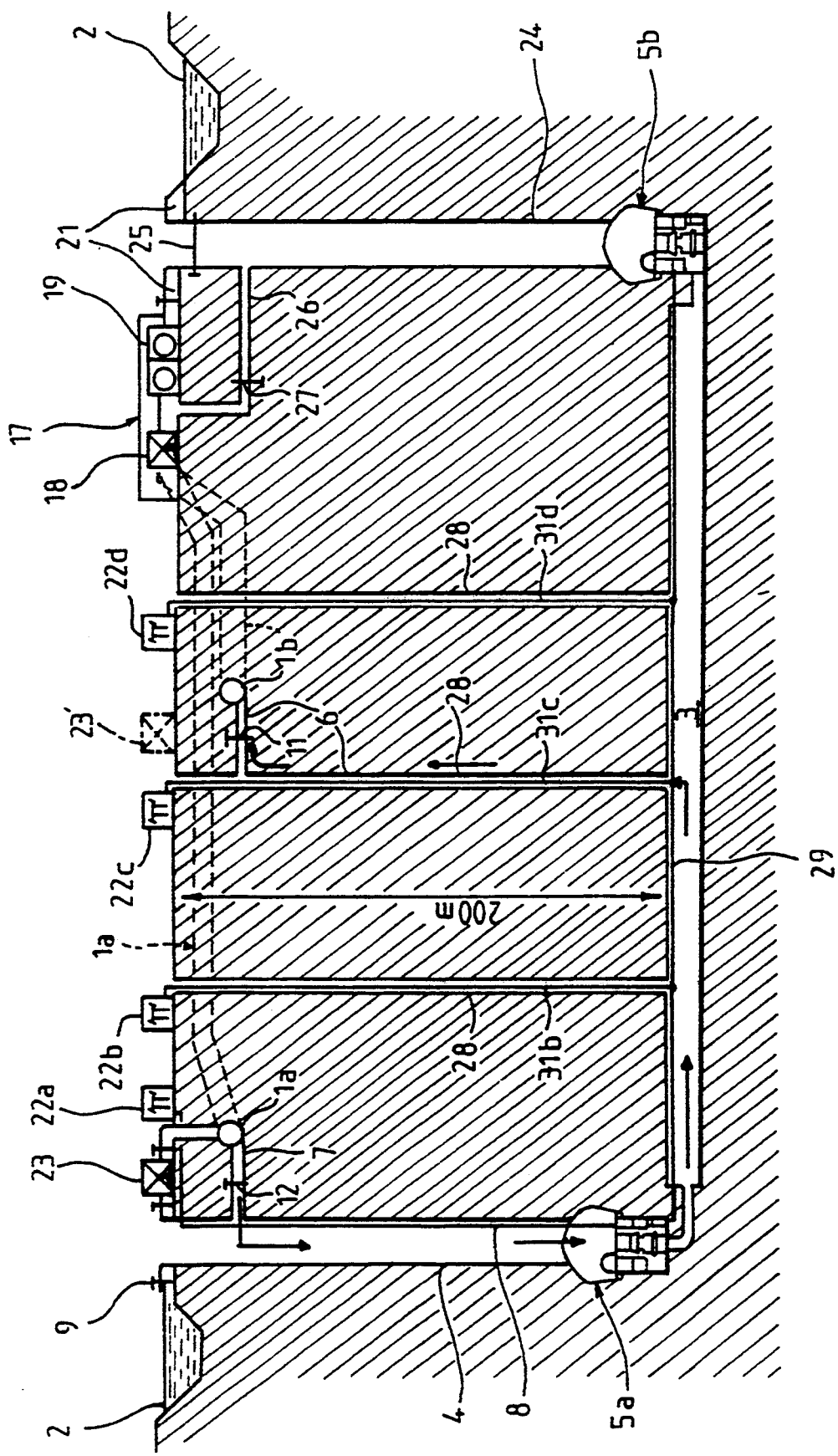

DRAINWATER/SEWAGE TREATMENT INSTALLATION FOR PRODUCING ELECTRICAL POWER AND FOR REGULATING A HYDRAULIC FLOW

FIELD OF THE INVENTION

The present invention relates to an installation for producing electrical power, comprising at least a first water reservoir situated at a first level, at least a second water reservoir situated at a second level considerably lower than the first level, at least a first conduit interconnecting the two reservoirs and provided with a valve putting the two reservoirs into communication with each other when open, at least one hydroelectric station situated at the second level or at a level close thereto and including at least one reversible pump-turbine set which is hydraulically connected to said first conduit and which is electrically connectable to an electricity distribution supply network.

BACKGROUND OF THE INVENTION

Installations of the above-described type are well known and are usually referred to as hydroelectric stations with pumped energy storage. During periods of peak electricity consumption, the function of stations of this kind is to provide electrical power to the electricity distribution supply network with which they are interconnected. During periods of slack electricity consumption, the excess capacity of the distribution supply network is used to refill the upper reservoir by pumping. Energy is thus stored by accumulating (raising) water in the upper reservoir. During peak periods, the hydroelectric station supplies electricity to the distribution supply network by running the water stored in the upper reservoir down to the lower reservoir through a turbine.

In another connection, large built-up areas, because of the area of land they cover and because of the magnitude of their populations, make it particularly difficult to treat various problems relating firstly to nature and secondly to human activity. Amongst these problems, particular mention may be made of:

1) spreading out peak flows in the sewage and rainwater networks (drainage network); and
2) providing electrical power during periods when demand is particularly high, particularly in the morning and in the evening in winter time, but possibly also during slack periods in the event of a failure in an electricity production unit or in an electric power transmission line.

With respect to spreading out peak rainwater flows, in an urban environment, rainwater mixed with sewage water must be subjected to physico-chemical and bacteriological treatments prior to being discharged into the natural environment, because of the numerous polluting factors carried by the water. In the present state of the art and in existing installations, sewage works or other plants for performing this treatment can absorb medium flow rates only. When confronted with occasional peak flow rates that exceed the treatment capacity of such works and sometimes also the capacity of the sewers, planning authorities can adopt various strategies:

a) discharge excess polluted water directly into the natural environment, thereby giving rise to consequences that are becoming less and less acceptable to the population;

b) undertake massive investments to match treatment capacity to peak flow rates, which strategy is difficult to justify on economic grounds; and c) increase the retention capacity of the main drainage network so as to spread out the peak flow and stagger the treatment of the excess volume of water. Such an increase in capacity may be obtained either by increasing the size of the main sewers and other main drains of the drainage network, or else by adding storage reservoirs connected to said network. Unfortunately, there is generally no room to locate large reservoirs within or close to built-up areas, and in addition the price of land is generally very high in such areas.

Under such conditions, it will be understood how advantageous it would be if large rainwater storage reservoirs could be created in the immediate proximity of large built-up areas, or even within them.

Returning to the supply of electricity during peak periods or in the event of a failure in an electricity production unit, matching electricity production to demand peaks requires installations capable of varying their rate of production very quickly from zero to a maximum value. There are essentially two types of installation capable of satisfying this requirement:

a) hydroelectric stations situated on water courses; and
b) thermal power stations fitted with generators that can be started quickly, such as gas turbines.

Unfortunately, such stations must be located at a certain distance form built-up areas. The mere fact that they produce electricity requires new electric power transmission lines to be installed and this is becoming more and more difficult in urban and near-urban fabric.

Under such conditions, it will be understood how advantageous it would be if electricity production systems could be located in the immediate proximity of large built-up areas, or even within them.

OBJECTS AND SUMMARY OF THE INVENTION

An object of the present invention is thus to resolve the two problems of spreading out peak flow rates in a drainage network and of providing electrical power, in particular during periods of peak consumption, i.e. in the morning or the evening in winter time, but possibly also during slack periods in the event of failure of an electricity production unit or of an electric power transmission line.

To this end, the present invention provides an installation of the type specified in the preamble, wherein in order to enable a water flow rate to be regulated, in particular that of rainwater in a drainage network, the second reservoir is deep underground, and the installation further comprises at least one second conduit provided with a valve and connecting said drainage network to the second reservoir.

Thus, the invention is essentially characterized by combining a drainage network with a pumped energy storage hydroelectric station, in which the second reservoir is deeply buried and in which at least said second reservoir is connected to the drainage network in order to be capable of serving as a temporary storage reservoir for the purpose of spreading out peaks in the flow rate of rainwater in said network. Thus, the hydroelectric station serves to produce electrical power by using the water stored in the upper reservoir, or else, in accordance with another aspect of the invention and as described below, by using suitably treated water coming from the drainage network; while rainwater flow rate peaks in the drainage network can be spread out by temporarily storing at least a fraction of said peak flows in the lower reservoir and optionally also in the upper reservoir in the event that it is constituted by an artificial reservoir. The lower and upper reservoirs may both be artificial reservoirs created or adapted at different depths underground. According to another aspect of the invention, the upper reservoir may be a natural stretch of water such as a river or a lake. As explained below, when the upper reservoir is constituted by a river, the installation of the invention may be used for regulating flow in a portion of the river, should that be necessary.

BRIEF DESCRIPTION OF THE DRAWINGS

Other objects, characteristics, and advantages of the invention appear more clearly on reading the following description of various embodiments of the invention given by way of example and with reference to the accompanying drawings, in which:

FIG. 1 is a theoretical diagram showing a first embodiment of the invention;

FIG. 2 is a theoretical diagram showing another embodiment of the present invention;

FIG. 3 is a map showing the northwest portion of the Paris region and showing an application of the invention to that region, by way of example; and FIGS. 4a to 4e are diagrammatic vertical section views containing the longitudinal axis of a tunnel that serves as a lower reservoir in the installation corresponding to the application shown in FIG. 3, with FIGS. 4a to 4e corresponding to different ways of operating the installation.

MORE DETAILED DESCRIPTION

The installation of the invention is designed to be installed within or near a built-up area for the purpose of producing electrical power and for regulating a hydraulic flow, e.g. rainwater runoff in the drainage network 1 of a built-up area, and it essentially comprises at least one upper reservoir 2 and at least one lower reservoir 3 that are connected to each other via at least one penstock conduit 4 whose bottom end opens out into a hydroelectric station 5 situated at the same level as or at approximately the same level as the lower reservoir 3 and connected thereto, plus at least one other conduit 6 or 7 connecting the drainage network 1 to the lower reservoir 3, as shown in FIGS. 1 and 2. The hydroelectric station 5 is similar to those found in conventional electricity production installations that have two reservoirs for pumped energy storage, and it is connected to the general electricity distribution supply network by an electric power line 8.

When one or more natural stretches of water (river, canal, lake) exist within or near a built-up area, and has water, some of which may be used for driving a turbine in the hydroelectric station 5, it is advantageous for the upper reservoir 2 to be constituted by one or more such natural stretches of water, as shown in FIG. 1. Under such circumstances, the penstock 4 is terminated at its top end by a water intake which may be similar to that used in a conventional hydroelectric installation. The top portion of the penstock 4 is provided with a valve 9 that serves, when open, to send water taken from the natural stretch of water forming the upper reservoir 2 down to the hydroelectric station 5 and thence to the lower reservoir 3. The conduit 6 connects the drainage network 1 directly to the lower reservoir 3, while the conduit 7 connects the network 1 to the lower reservoir 3 indirectly, the bottom portion of said conduit 7 being connected to the penstock 4 between the valve 9 and the hydroelectric station 5. Valves 11 and 12 are inserted in the conduits 6 and 7 respectively and, when open, they serve to divert a fraction of the water flowing in the drainage network 1 towards the lower reservoir 3.

The FIG. 1 installation operates as follows:

a) During a period of peak electricity consumption, i.e. in the morning or the evening in winter time, or exceptionally during a period of short duration in the event of failure of an electricity production unit in the general electricity distribution supply network, the valve 9 is opened so that the lower reservoir 3 receives water from the stretch of water forming the upper reservoir 2, said water passing via the penstock 4 and the hydroelectric station 5. On passing through the station 5, the water drives turbine means so as to produce electrical power which is delivered to the electricity distribution supply network by the line 8. The water continues to be used for driving turbine means as a function of demand for electricity, and possibly until the reservoir 3 has been completely filled.

b) Between periods of peak electricity consumption, i.e. when the general electricity distribution supply network is capable of producing excess electricity at low cost, the hydroelectric station 5 uses said excess electricity from the electricity distribution supply network, as taken via the line 8, to operate in pumping mode for the purpose of emptying the reservoir 3 and returning the water to the stretch of water 2 so that the reservoir 3 is emptied prior to the following peak period. Given that about 10 hours elapse between two successive peak periods, and that the operation of emptying the reservoir 3 can be spread out over said period of about 10 hours, the ratio between the power delivered by the turbine and the power consumed by the pump in the hydroelectric station 5 may be about five.

c) During periods when heavy rainfall is liable to occur, the lower reservoir 3 must be kept empty so as to be ready to receive a fraction of the water being conveyed by the network 1 on opening of the valve 11 and/or of the valve 12 (with the valve 9 naturally being closed at that time). Once the downpour is over, the water contained in the reservoir 3 is pumped by the hydroelectric station 5 so as to be returned to the network 1 via the penstock 4 and the conduit 7 at a flow rate that is compatible with the treatment capacity of the sewage work(s) to which the network 1 is connected. If the conduit 7 is not provided, then a water-raising pump 13 capable of being electrically powered from the general electricity distribution supply network by means of an electric power line 14 must be inserted in the conduit 6 for the purpose of returning the rainwater contained in the reservoir 3 to the network 1. The pump 13 may be omitted if the conduit 7 is provided. It will be observed that in this mode of operation, there is no communication between the rainwater from the network 1 and the stretch of water 2, thereby avoiding any pollution thereof.

It is important to make sure that the lower reservoir 3 is empty whenever it is required to respond to either of the purposes for which it is provided (namely: driving turbine means to generate electricity; or providing temporary storage for rainwater). For example, it might be feared that a downpour could take place immediately after a period of peak electricity consumption, so that there has not been sufficient time to empty the reservoir 3, or else that a downpour could occur immediately before a period of peak electricity consumption, so that the station 5 is prevented from producing electricity.

Fortunately, responses to these two functions are generally found on a long term statistical basis to be very different in time. Periods of peak electricity consumption are concentrated on cold winter days, and specifically, it is very rare for downpours to take place at that time. Under such conditions, there is practically no chance of conflict arising in the use of the reservoir 3, so it is thus available over a complete year for responding in succession to both of the abovementioned distinct functions, namely producing electrical power during periods of peak consumption in cold weather; and also regulating rainwater flows in the network 1 for the remainder of the year.

The only conflict that might arise in the use of the reservoir 3 would be in the event of a failure of a production unit in the general electricity distribution supply network or in an electric power transmission line taking place at a time when downpours are forecast. Thus, when an installation of the present invention is implemented, it is necessary, in practice, to define priorities in the use of the reservoir 3 in order to settle such a conflict. For example, priority could be given to regulating the flow of rainwater in the network 1.

If there is no natural stretch of water within a built-up area or near thereto having water that can be used for driving turbine means, it is then necessary to create one or more upper reservoirs 2, either on the surface of the ground if that can be achieved at low cost, or else at a shallow depth underground in order to implement the installation of the invention. FIG. 2 is a diagram of an installation of this kind, in which the upper reservoir 2 and the lower reservoir 3 are both formed underground, but at different depths, the two reservoirs 2 and 3 preferably having the same capacity. In FIG. 2, elements of the installation that are identical or that perform the same function as elements in the installation of FIG. 1 are designed by the same reference numerals. In the FIG. 2 installation, the upper reservoir 2 is also connected to the drainage network 1 via a conduit 15 that is provided with a valve 16.

In the installation of FIG. 2, the upper reservoir 2 performs the same function as the natural stretch of water 2 in the installation of FIG. 1. Both installations operate in similar manner and, as a result, only the differences in the operation of the FIG. 2 installation relative to the installation of FIG. 1 are described. Whereas the stretch of water 2 in the FIG. 1 installation always contains water, the upper reservoir 2 in the installation of FIG. 2 is normally kept empty during seasons when downpours may occur. During such seasons, in the event of a downpour, a fraction of the rainwater travelling along the drainage network 1 can be stored temporarily in both of the reservoirs 2 and 3 by opening the valves 11 and 16. Once the downpour is over, the valve 16 is closed and the rainwater stored in the reservoirs 2 and 3 is returned to the network 1 via the conduit 6 by means of the pump 13, the valve 9 being opened to allow the water contained in the reservoir 2 to move down the penstock 4 into the reservoir 3. On passing through the hydroelectric station 5, the water drives turbine means to produce electricity that can be used for powering the pump 13. In a variant, it is possible to use another pump (not shown) inserted in the conduit 15 for returning the water contained in the reservoir 2 to the network 1.

Shortly before winter or before cold periods, the reservoir 2, if empty, must be filled with water from the network 1 via the duct 15 by opening the valve 16 while the valve 9 is closed, thereby readying the installation to satisfy a demand for electrical power during a period of peak electricity consumption. During a period of peak consumption, the valve 9 is opened and the water in the reservoir 2 drives turbine means in the hydroelectric station 5 so as to produce electrical power. Between two successive periods of peak electricity consumption, the station 5 operates in pumping mode and returns the water contained in the reservoir 3 to the reservoir 2.

Although it is mentioned above that the reservoirs 2 and 3 in the FIG. 2 installation have the same capacity, it is possible, in a variant, for the reservoir 3 to have twice the capacity so as to be capable on its own of temporarily storing a fraction of the rainwater passing through the network 1 in the event of a downpour. With a reservoir 3 of this size, the reservoir 2 can be kept full of water, at least during periods when downpours do not occur, thereby enabling it to respond to a demand for electrical power, should that be necessary, and naturally providing the lower reservoir 3 is empty or at least half empty at that time.

The water that passes through the network 1 is generally polluted water. Consequently, it may be necessary, in practice to apply pretreatment to the water that is sent to and is temporarily stored in the reservoir 3 of the installations in FIGS. 1 and 2, and the same may also apply to the water which is sent to and is temporarily stored in the reservoir 2 in the installation of FIG. 2. For example, filter units (bar screens) may be inserted in the upper portions of the conduits 6, 7, and 15 in order at least to eliminate any solid objects and other macroparticles contained in the water passing along the network 1.

Although FIGS. 1 and 2 show only one upper reservoir 2 and only one lower reservoir 3, a plurality of upper reservoirs and a plurality of lower reservoirs could naturally be provided, and said reservoirs may be connected to one another in various different ways, in series, in parallel, or in series-parallel, and they may be operated depending on requirements or depending on the total desired capacity for water storage, merely by opening their appropriate respective valves. For example, some reservoirs may be in operation while others are out of operation for maintenance or repair purposes.

The reservoir 3 of FIG. 1 or the reservoirs 2 and 3 of FIG. 2 may be in the form of underground cavities, either pre-existing or else created by using various different digging techniques (tunneling machines, excavating shields, excavation using explosives, or using a plurality of roadheaders, etc. . . . ). When the reservoirs 2 are underground reservoirs, they are provided at a shallow depth in the ground (no more than a few tens of meters (m)), whereas the reservoirs 3 are provided at great depth (at least 100 meters and preferably about 200 meters).

The unit volume of cavities forming the reservoirs 2 and 3 may vary to a large extent depending on requirements, on geological conditions, and on the digging techniques used. Thus the unit volume may lie in the range several tens to several hundreds of thousands of m³, or even several millions of m³. The total capacity of the reservoirs 2 and 3 naturally depends on observed requirements for rainwater storage and for electricity production, and these requirements themselves depend very greatly on the size of the built-up area, geographical conditions, rainfall, pollution risks that public authorities seek to guard against, etc. . . . . .

There now follows a description of an implementation of the invention as applied to the Paris region and given with reference to FIGS. 3 and 4a to 4e.

In the map of FIG. 3: heavy continuous line 2 represents the Seine, which may play the role of the upper reservoir 2 in FIG. 1; heavy dashed lines 1a to 1e represent the main drains of the drainage network of the northwest portion of the Paris region (main drains 1a, 1b, 1c, and 1e are already in existence, whereas main drain 1d is presently under construction); block 17 designates the sewage works at Acheres where the main drains 1a, 1b, 1c, and 1e terminate and where the main drain 1d will terminate; the sewage works 17 includes at least one pretreatment unit 18 (for eliminating solid objects and large particles contained in the sewage, e.g. by bar screens, sand catcher, etc.) and a plurality of treatment units 19 (bacterial treatment, sedimentation ponds, etc. . . . ) for treating sewage in conventional manner before discharging the treated water into the Seine via discharge channel 21; blocks 22a to 22f designate existing transformer stations that form a portion of the general electricity distribution supply network in the Paris region; and block 23 designates a pretreatment unit similar to the unit 18 and situated at La Briche for pretreatment of the sewage coming from main drain 1a.

In the map of FIG. 3, heavy dot-dashed line 3 designates a reservoir that may be implemented, for example, in the form of an underground tunnel, e.g. at a depth of 200 meters and extending from the town of La Briche to the Achères sewage works and passing under the town of Colombes; blocks 5a and 5b designate underground hydroelectric stations for installing at respective ends of the tunnel 3.

The elements described above are also shown in FIGS. 4a–4e which constitute a vertical section including the longitudinal axis of the tunnel 3 and developed flat. FIGS. 4a to 4e also show: the conduit 7 which puts the main drain 1a into communication with the penstock 4 when the valve 12 is open; the conduit 6 which puts main drain 1b into communication with the tunnel 3 when valve 11 is open; a penstock 24 which connects the discharge channel 21 from the sewage works 17 to the hydroelectric station 5b when the valve 25 is open and which co-operates with a conduit 26 to connect the hydroelectric station 5b to the sewage works 17 at a point situated between the pretreatment unit 18 and the treatment units 19 when the valve 27 is open and the valve 25 is closed; and shafts 28 which put the tunnel 3 into communication with the atmosphere for ventilating the tunnel 3 and/or for balancing pressures therein. It will be observed that the conduit 6 can be installed in one of the shafts 28. FIGS. 4a to 4e also show the electric power line 8 which connects the hydroelectric station 5a to a transformer station 22a, electric power line 29 which interconnects the two hydroelectric stations 5a and 5b, and electric power lines 31b, 31c, and 31d which connect the line 29 to transformer stations 22b, 22c, and 22d, respectively. As shown in FIGS. 4a–4e, the well bore for the penstock 4, the tunnel 3, the shafts 28, and possibly also the penstock 24 may advantageously be used for passing the electric power lines 8, 29, and 31.

As already mentioned above, the main drains 1a to 1e already exist or are under construction, the sewage works 17 is already in existence, as are the transformer stations 22a to 22f. To make an installation of the invention, it therefore suffices in the example of FIGS. 3 and 4: to dig the boreholes necessary for installing the penstocks 4 and 24 and the conduit 6; to install said penstocks and conduit; to connect them to the main drains 1a and 1b and to the sewage works 17 as shown in FIGS. 4a–4e; to install a water intake including a valve 9 in the Seine at La Briche; to connect the pretreatment unit 23 to the penstock 4; to dig the tunnel 3; to build the hydroelectric stations 5a and 5b at the ends of the tunnel 3; to bore the ventilation or pressure balancing shafts 28; to install the electric power lines 8, 29, and 31; and optionally to provide one or more additional pretreatment units, e.g. a unit 23' that may be installed at Colombes-Fallou to pretreat water coming from main drain 1b prior to applying it to the tunnel 3 via conduit 6.

In the embodiment described above, where the tunnel 3 is situated at a depth of about 200 m and extends from the town of La Briche to the sewage works at Achères, passing via Colombes, giving a length of about 14 kilometers, a water storage capacity of about 500,000 m³ is obtained for a tunnel having an inside diameter of 6.80 m.

For example, the hydroelectric station 5a may include a hydroelectric production unit fitted with two main vertical axis generator sets (a Francis turbine and a 35 MVA alternator). For example, the hydroelectric station 5b may include a hydroelectric production unit fitted with two main vertical axis generator sets (a Francis type reversible pump-turbine and a 25 MVA alternator). Under such conditions, electrical power can be produced as follows:

1) During a period of peak power consumption, and in the event of a network defect, water can be taken:
   a) From the Seine at La Briche (FIG. 4a), said water driving turbines for 2 hours at a rate of 40 m³ per second, constituting about 12% of the mean flow of the Seine. Under such conditions, the station 5a produces power at 70 MW.
   b) From clean water available at the outlet of the Achères sewage works (see also FIG. 4a) at a rate of 30 m³ per second for 2 hours. The hydroelectric station 5b then provides power at 50 MW in addition to that provided by the station 5a.

Between peak periods, the water stored in the reservoir 3 is returned to the Seine at Achères by pumping water from the reservoir 3 during slack periods via the station 5b at a rate of 20 m³ per hour over a period of about 8 hours (FIG. 4b). The water is thus discharged 33 kilometers downstream from the point where it is taken at La Briche and it does not disturb the course of the Seine within the built-up area of Paris.

2) In the event of a failure in the electricity distribution supply network, it is possible:
   a) to use the clean water at the outlet from the Achères sewage works at a rate of 30 m³ per second to drive turbine means (FIG. 4a) without disturbing the course of the Seine; and
   b) to use water taken from the Seine at La Briche at a rate of 0 to 30 m³ per second to drive turbine means, with the flow rate being determined as a function of the flow available from the Seine without disturbing it when the water level is low.

Under such conditions, at least 50 MW is available from the station 5b and additional power may also be available from the station 5a to make up for a failure in the electricity distribution supply network. The water that collects in the tunnel 3 is subsequently discharged to the Seine at Achères during slack periods (FIG. 4b) in the manner described above.

3) In the event of downpours, rainwater flow rate in one or more of the main drains of the drainage network 1, e.g. main drain 1a, can be regulated as shown in FIG. 4c. A fraction of the water travelling along main drain 1a is diverted through pretreatment unit 23 and penstock 4 into the tunnel 3, and another fraction is diverted by the conduit 26 and the penstock 24 into the tunnel 3. The second diversion at the sewage works 17 offloads a fraction of the water to be treated by the treatment units 19. If the rainwater comes from a highly localized thunderstorm, and assuming that not all of the main drains from the drainage network 1 are saturated, it is also possible to make use of unsaturated main drains, e.g. the main drain 1b, as capacity for storing and transporting rainwater. This can be done by siphoning from the saturated main drain(s), e.g. the main drain 1a, via the tunnel 3 and the conduit 6, as shown in FIG. 4e.

Once the downpour or thunderstorm is over, the water stored in the tunnel 3 is discharged into the Seine at Achères after being treated by the sewage works 17 as shown in FIG. 4d, and this is done, for example, at a rate of 2 m³ to 3 m³ per second over a period of 50 hours, so as to avoid overloading the treatment unit 19 in the sewage works which must continue treating sewage coming from the drainage network.

From the above, it can be seen that in addition to its function of storing water, the tunnel 3 can be used to provide a cross-link between at least some of the main drains from the drainage network 1, thereby contributing to obtaining better regulation of the flow of sewage through the set of main drains.

In the embodiment described above, the capacity of the tunnel 3 may be further increased by making an additional branch of the tunnel, e.g. running from Colombes to Chatou as can also be seen in FIG. 3. In plan view, this branch of the tunnel crosses the main drains 1c, 1d, and 1e, and it may be connected to them via conduits similar to the conduit 6 in FIGS. 4a to 4e. Under such circumstances, not only is the storage capacity of the tunnel 3 increased, but all of the main drains 1a to 1e are linked together, thereby making it possible to regulate their various flows.

It may also be observed that it is possible to use the tunnel 3 to bypass a portion of the Seine between La Briche and Achères, thus contributing, to some extent, to regulating the flow of the Seine itself between these two points.

From the above, it can be seen that the installation of the present invention enables electrical power to be produced not only during a period of peak power consumption, but also in the event of a failure of a production unit or of a power transmission line. The invention also serves to regulate the flow of rainwater or of sewage in the drainage network of a built-up area. It makes it possible to link together the main drains of the drainage network and consequently to offload one main drain onto the others. This makes it possible to reduce deliberate or accidental discharge of sewage into the natural environment. The invention also makes it possible to improve the flow of a river by bypassing a fraction of its course. Finally, the invention makes it possible to interconnect electrical transformer stations so as to increase the reliability of operation of an electricity distribution supply network without any need to install overhead lines that are difficult to route and of unwelcome appearance in an urban environment.

Naturally, the embodiments of the invention described above are given purely by way of non-limiting, indicative example, and numerous modifications may easily be provided by the person skilled in the art without thereby going beyond the ambit of the invention. Thus, in particular, it is possible for the upper reservoir 2 to comprise both one or more natural or artificial stretches of water, assuming any exist, together with one or more cavities dug out or developed in the ground. The pump 13 in FIGS. 1 and 2 may be replaced by a reversible hydroelectric station similar to the station 5 if use is made of the capacity of the drainage network 1 as a water reservoir for producing electrical power in a manner analogous to that shown in the right-hand portion of FIG. 4c. Furthermore, instead of installing the hydroelectric station(s) at one or both ends of the tunnel 3, they may be installed at arbitrary points along the tunnel 3. For example, a hydroelectric station could be installed at the bottom of conduit 6 in FIG. 4a, in which case a point for taking water from the Seine may also be provided at Colombes and connected to the conduit 6 so that it becomes a penstock analogous to the penstock conduit 4 as described with reference to FIG. 4a.

I claim:

1. An installation for producing electrical power and for regulating a water flow rate to a sewage treatment plant having a predetermined treatment capacity, comprising at least a first water reservoir situated at a first level, at least a second water reservoir situated at a second level considerably lower than the first level, at least a first conduit interconnecting the two reservoirs and provided with a valve putting the two reservoirs into communication with each other when open, at least one hydroelectric station situated at the second level or at a level close thereto and having at least one reversible pump-turbine set which is hydraulicly connected to said first conduit for supplying electricity to an electricity distribution supply network, wherein in order to enable said water flow rate to be regulated, in particular that of rainwater in a drainage network, the second reservoir is deep underground, and the installation further comprises at least one second conduit provided with a valve and connecting said drainage network to the second reservoir, said valve of said at least one second conduit being open when said water flow rate in said drainage network exceeds said predetermined treatment capacity.

2. An installation according to claim 1, wherein the first reservoir is a natural stretch of water such as a river or a lake, and the second reservoir is a reservoir formed underground.

3. An installation according to claim 2, wherein the first and second reservoirs are both formed underground, at different depths.

4. An installation according to claim 3, including at least one other conduit provided with a valve and connecting the drainage network to the first reservoir.

5. An installation according to claim 2, wherein the bottom end of the second conduit is directly connected to the second reservoir through a reversible hydroelectric station.

6. An installation according to claim 2, wherein the bottom end of the second conduit is connected to the first conduit between the valve thereof and the hydroelectric station.

7. An installation according to claim 2, wherein the first reservoir is a river, wherein the drainage network terminates at a sewage works including a pretreatment unit followed by at least one treatment unit that discharges treated water into the river via a discharge channel, and wherein the top end of the second conduit is connected to the drainage network at at least one of the following points: a point situated between the pretreatment unit and the treatment unit; and a point on the discharge channel.

8. An installation according to claim 7, wherein a hydroelectric station is provided at the bottom end of the second conduit.

9. An installation according to claim 8, wherein the second reservoir is a tunnel having a first end located beneath the sewage works, the bottom end of the second conduit being connected to said first end of the tunnel via the hydroelectric station, and a second end of the tunnel lies beneath a point of the river situated upstream from the point where said discharge channel discharges into the river, the bottom end of the first conduit being connected to said second end of the tunnel via another hydroelectric station.

10. An installation according to claim 9, wherein a plurality of pressure balancing shafts are provided between the tunnel and the surface of the ground, and wherein at least some of the pressure balancing shafts, the first and second conduits, and the tunnel also serve as passages for electric power lines interconnecting the hydroelectric stations and one or more transformer stations of an electricity distribution supply network.

11. An installation according to claim 1, wherein at least the second reservoir is made in the form of a tunnel.

12. An installation according to claim 11, wherein, in plan view, the tunnel forming the second reservoir follows a path that crosses a plurality of branches of the drainage network, and wherein a conduit is provided at each crossing point putting the tunnel into communication with the corresponding branch of the drainage network.

13. An installation according to claim 1, wherein a water-raising pump is inserted in said at least one second conduit connecting said drainage network to the second reservoir.

14. A method for regulating the flow rate of water to a sewage treatment plant having a predetermined treatment capacity, comprising the steps of:
diverting a portion of said water flowing in a drainage network to a reservoir located below said drainage network when said flow rate of said water exceeds said predetermined treatment capacity of said sewage treatment plant;
storing said portion of said water in said reservoir; and
pumping said portion of said water stored in said reservoir back up into said drainage network after said flowrate of said water in said drainage network has resumed a rate below said predetermined treatment capacity of said sewage treatment plant.

* * * * *